United States Patent [19]

Horiuchi et al.

[11] Patent Number: 5,071,816

[45] Date of Patent: Dec. 10, 1991

[54] CATALYST FOR PURIFICATION OF EXHAUST GAS FROM DIESEL ENGINE

[75] Inventors: Makoto Horiuchi; Koichi Saito, both of Himeji, Japan

[73] Assignee: Nippon Shokubai Kagaku Kogyo Co., Ltd., Osaka, Japan

[21] Appl. No.: 520,378

[22] Filed: May 8, 1990

[30] Foreign Application Priority Data

May 8, 1989 [JP] Japan ................................. 1-113627

[51] Int. Cl.$^5$ ....................... B01J 23/10; B01J 23/42; B01J 23/44; B01J 23/46
[52] U.S. Cl. ................................. 502/302; 423/215.5
[58] Field of Search ................. 502/302, 261, 262, 65, 502/64; 423/215.5

[56] References Cited

U.S. PATENT DOCUMENTS

| | | | |
|---|---|---|---|
| 3,870,455 | 3/1975 | Hindin | 502/304 |
| 3,951,860 | 4/1976 | Acres et al. | 502/302 |
| 4,504,598 | 3/1985 | Ono et al. | 502/303 |
| 4,639,432 | 1/1987 | Holt et al. | 502/302 X |
| 4,868,148 | 9/1989 | Henk et al. | 502/261 X |
| 4,904,633 | 2/1990 | Ohata et al. | 502/261 X R |
| 4,935,393 | 6/1990 | Schwetje et al. | 502/65 |

FOREIGN PATENT DOCUMENTS

| | | | |
|---|---|---|---|
| 61-129030 | 6/1986 | Japan | 423/215.5 |
| 61-149222 | 7/1986 | Japan | 423/215.5 |
| 2024646 | 1/1980 | United Kingdom | 423/215.5 |

*Primary Examiner*—William J. Shine
*Assistant Examiner*—D. J. McGinty
*Attorney, Agent, or Firm*—Sherman and Shalloway

[57] ABSTRACT

A catalyst for purification of exhaust gas from a Diesel engine wherein a catalyst component containing (a) refractory inorganic oxide, (b) oxide of at least one element selected from the group consisting of praseodymium, neodymium and samarium, and (c) at least one noble metal selected from the group consisting of platinum, palladium and rhodium provided that palladium is never selected alone is borne on a refractory three-dimensional structure.

14 Claims, No Drawings

CATALYST FOR PURIFICATION OF EXHAUST GAS FROM DIESEL ENGINE

This invention relates to a catalyst for purifying harmful components in exhaust gases from Diesel engines. More specifically, this invention relates to a catalyst for purification of exhaust gases from Diesel engines which is capable of purifiying fine particle substances (mainly consisting of liquid or solid high molecular weight hydrocarbon fine particles, solid carbon fine particles, etc.) in exhaust gases from Diesel engines at a low temperature, has a high durability under a severe condition such as a high temperature oxidation atmosphere.

Recently, fine particle substances in exhaust gases from Diesel engines (mainly consisting of solid carbon fine particles, sulfur-containing fine particles such as sulfate, liquid or solid high molecular weight hydrocarbon fine particles, and the like) have particularly become a problem on environment and hygiene. Namely, since almost all these fine particles have a particle size of 1 micron or less and thus readily float into the atmosphere, there is a great fear that they are taken into human body by respiration. Therefore, the government office is planning toward the direction to make the regulation on exhaustion of these fine particles from Diesel engines more severe.

As a method for removal of these fine particles, a catalyst method is studied wherein a catalyst substance capable of burning carbonaceous fine particles is deposited on a refractory three-dimensional structure such as ceramic foam, wire mesh, metal foam or wall flow type ceramic honeycomb, fine particle substances contained in exhaust gases from Diesel engines or the like ar captured, and further the carbonaceous fine particles are burned for purification under the discharge conditions (gas composition and temperature) of an exhaust gas generated in ordinary operation of the engine (or using heating means such as electric heater).

As a catalyst for purification of exhaust gases from Diesel engines is generally desired a catalyst which has a high performance to burn carbonaceous fine particles, is capable of igniting them even at a fairly low temperature and withstands even continuous operation under a high load (so-called has a high temperature durability).

However, no catalyst sufficiently suitable for this condition has so far been proposed.

Such various proposals as follow have so far been made for the purpose of enhancement of purification efficiency of the carbonaceous fine particles.

As for catalysts for combustion of carbonaceous fine particles using platinum group metal, are disclosed as catalysts effective for SOF (soluble organic fraction, i.e. organic solvent-soluble components) in Japanese Laid-Open Patent Publication No. 24597/1980 rhodium (7.5 %)/platinum alloy and the like, platinum/palladium (50/50) mixture and the like, palladium deposited on tantalum oxide or cerium oxide and the like, and an alloy consisting of palladium and 75 % by weight or less of platinum and the like.

In addition, Japanese Laid-Open Patent Publications Nos. 129030/1986, 149222/1986 and 146314/1986 disclose catalyst compositions comprising palladium and rhodium as main components, and alkali metal, alkaline earth metal, copper, lanthanum, zinc, manganese or the like as minor component. Further, Japanese Laid-Open Patent Publication No. 82944/1984 discloses a catalyst composition comprising at least one member selected from copper, alkali metal, molybdenum and vanadium, and at least one member selected from platinum, rhodium and palladium.

Recently, in accordance with improvement of Diesel engines, there is a tendency that the content of fine particle substances in exhaust gases exhausted from Diesel engines decrease and there is a tendency that the SOF content of the fine particle substances increases. Further, it has been planned to reduce the sulfur content of fuels. Thus, exhaust gases exhausted from the latest Diesel engines are different from exhaust gases exhausted from usual Diesel engines in properties. However, any catalyst for purification of exhaust gases suitable for such latest circumstances has so far not been proposed.

The object of the present invention lies in providing a catalyst for purification of exhaust gases of practical use which has a performance to purify even at low temperatures harmful components in Diesel engine exhaust gases such as carbonaceous fine particles, hydrocarbons and carbon monoxide, and is capable of maintaining itself stably for a long time under the exhaust gas atmosphere of Diesel engines (namely has heat resistance and durability).

As a result of assiduous investigation for the purpose of attaining the above object, the present inventors have found that a catalyst wherein oxide of at least one rare earth element selected from the group consisting of praseodymium, neodymium and samarium, and at least one noble metal selected from the group consisting of platinum, palladium and rhodium coexist displays an excellent performance to purify even at a low temperature harmful components such as carbonaceous fine particles, hydrocarbons and carbon monoxide.

Thus, according to the present invention is provided a catalyst for purification of exhaust gases from Diesel engines wherein (a) refractory inorganic oxide, (b) oxide of at least one element selected from the group consisting of praseodymium, neodymium and samarium, and (c) at least one noble metal selected from the group consisting of platinum, palladium and rhodium provided that palladium is not selected alone are deposited on a refractory three-dimensional structure.

The reason why palladium is not selected alone as the noble metal (c) in the present invention is that since in the prior application by the same applicants as that in the present application, namely U.S. Ser. No. 268,371 (filed on Nov. 11, 1988) or European Patent Application No. 88118369.9 (filed on Nov. 3, 1988) is disclosed and claimed an exhaust gas purification catalyst for purifying carbonaceous fine particles comprising a refractory three-dimensional structure and deposited thereon, (a) a refractory inorganic oxide, (b) palladium and (c) an oxide of at least one element selected from the group consisting of praseodymium, neodymium and samarium as catalyst components, it is necessary to distinguish the invention of the present application from the said invention.

The above oxides of rare earth element exhibit a high activity in an oxygen exchange reaction under an oxidation atmosphere and have a function as an oxygen supply source for combustion of carbonaceous fine particles, and as a result display an excellent purification performance even at a low temperature by a synergistic effect with noble metal such as platinum, palladium or rhodium. The oxides of rare earth element also have a function to restrain deterioration of the activity of platinum, palladium and rhodium under the atmosphere of Diesel engine exhaust gas. Therefore, the catalysts of the present invention can maintain excellent performances for a long time under the atmosphere of Diesel engine exhaust gas of a high temperature of 400 ° C. or more.

Examples of the above refractory inorganic oxide to be used include activated alumina, silica, titania, zirconia, silica-alumina, alumina-zirconia, alumina-titania, silica-titania, silica-zirconia, titania-zirconia, zeolite, etc., and zirconia is mentioned among them as a base material suitable for enhancement of heat stability of the rare earth element.

Suitably used as starting materials of praseodymium, neodymium and samarium are commercially available their oxides, chlorides, nitrates, carbonates and the like.

There can be used as starting materials of platinum chloroplatinic acid, dinitrodiaminoplatinum, platinumtetramine chloride, platinumsulfito complex salt, etc., as starting materials of palladium palladium nitrate, palladium chloride, palladium tetramine chloride, palladium-sulfito complex salt, etc., and as starting materials of rhodium rhodium nitrate, hexamminerhodium chloride, rhodiumsulfito complex salt, etc.

Amount of the refractory inorganic oxide to be deposited is 3 to 300 g, preferably 10 to 200 g per liter of the three-dimensional structure. Amount of oxide of at least one element selected from the group consisting of praseodymium, neodymium and samarium to be deposited is 2 to 200 g, preferably 3 to 100 g in total per liter of the three-dimensional structure. Amount of at least one noble metal selected from platinum, palladium and rhodium to be deposited is 0.1 to 10 g, preferably 0.5 to 5 g in total per liter of the three-dimensional structure.

The catalyst of the invention may contain as an additional component at least one element selected from copper, silver, zinc, potassium and sodium in an amount in the range of 0.1 to 3 g, preferably 0.2 to 1 g in total per liter of the three-dimensional structure in order to suppress generation of sulfates [sulfur trioxide ($SO_3$) and sulfuric acid mist generated by oxidation of sulfur dioxide ($SO_2$)]. However, when a fuel containing 0.1 % by weight or more of sulfur content is used in a Diesel engine installed with such a catalyst which contains platinum, a large amount of sulfates are generated, and thus use of platinum causing increase of sulfur-containing fine particles is not desirable, but it is preferred to use a catalyst wherein palladium and rhodium are deposited in an amount in the range of 0.1 to 10 g and 0.01 to 1.0 g respectively per liter of the refractory three-dimensional structure, and the depositing ratio of palladium/rhodium is 1 to 50.

Although process of preparation of the catalyst of the invention is not limited, the following processes are mentioned as preferred ones:

(1) Powder of refractory inorganic oxide is wet-pulverized to form a slurry, a refractory three-dimensional structure is dipped in the slurry, excessive slurry is removed, and the resulting structure is dried at 80° to 50 ° C. and then calcined at 300° to 850 ° C., preferably 400 to 800 ° C. to obtain the three-dimensional structure coated with the refractory inorganic oxide. The structure coated with the refractory inorganic oxide is then dipped in an aqueous solution containing, each in a predetermined amount, palladium compound; compound of at least one element selected from the group consisting of praseodymium, neodymium and samarium; and compound of at least one element selected from platinum, palladium and rhodium, and, after removal of excessive solution, dried at 80° to 250 ° C. and then calcined at 300° to 850 ° C., preferably 400° to 800 ° C. to obtain a completed catalyst.

(2) A refractory three-dimensional structure is dipped in a slurry containing an oxide of at least one element selected from the group consisting of praseodymium, neodymium and samarium; and refractory inorganic oxide, and, after removal of excessive slurry, dried at 80° to 250 ° C. and then calcined at 300° to 850 ° C., preferably 400° to 800 ° C. to provide a coat layer on the refractory three-dimensional structure. The resulting three-dimensional structure is dipped in an aqueous solution containing a predetermined amount of compound of at least one element selected from platinum, palladium and rhodium, dried at 80° to 250° C., and then calcined at 300° to 850° C., preferably 400° to 800 ° C. to obtain a completed catalyst.

(3) Refractory inorganic oxide is dipped in an aqueous solution containing, each in a predetermined amount of a compound of at least one element selected from the group consisting of praseodymium, neodymium and samarium; and a compound of at least one element selected from platinum, palladium and rhodium, dried at 80° to 250 ° C., and then calcined at 300° to 850 ° C., preferably 400° to 800 ° C. to deposit and fix the oxide of the element on the refractory inorganic oxide. The resulting refractory inorganic oxide is then wet-pulverized to form a slurry. A refractory three-dimensional structure is dipped in this slurry, and, after removal of excessive slurry, dried at 80° to 250 ° C. and then calcined at 300° to 850 ° C., preferably 400° to 800 ° C. to obtain a completed catalyst.

Examples of the refractory three-dimensional structure to be used include a ceramic foam, an open flow ceramic honeycomb, a wall flow type honeycomb monolith, an open flow metal honeycomb, a metal foam and a metal mesh. In this connection, when exhaust gas from Diesel engines contain 100 mg or less of fine particle substances per $m^3$ of the exhaust gas and the fine particle substances 20 % or more of SOF, an open flow type ceramic honeycomb or a metal honeycomb is preferably used as the refractory three-dimensional structure.

The exhaust gas purification catalyst of this invention containing the refractory inorganic oxide; the oxide of at least one element selected from the group consisting of praseodymium, neodymium and samarium; and at least one noble metal selected from the group consisting of platinum, palladium and rhodium (provided that palladium is not selected alone) has a combustion performance of carbonaceous fine particles at low temperatures, displays its excellent purification performance in a good reproducibility even at low temperatures, and is excellent in heat resistance and durability and thus can maintain its initial activity for a long time in the exhaustion condition (gas composition and temperature) of Diesel engine exhaust gas.

The present invention is illustrated in more detail below according to examples and comparative examples, but that the invention is not limited only to these examples.

EXAMPLE 1

Alumina (2 kg) having a specific surface area of 130 $m^2/g$ was weighed and wet-pulverized with water to form a slurry. Wall flow type monolith carriers made of cordierite (honeycomb type and wall flow type three-dimensional structures wherein each adjacent opening of both end faces is alternately blocked so that gas is passed only through the partition wall) having a size of 5.66 inches in diameter×6.00 inches in length was dipped in the slurry, and, after removal of excessive slurry, dried at 150° C. for 3 hours, and then calcined at 500° C. for one hour to obtain a three-dimensional structure deposited with alumina.

Then, 900 g of neodymium nitrate Nd(NO$_3$)$_3$.6H$_2$O]and chloroplatinic acid in an amount of 9.2 g in terms of platinum were dissolved in deionized water to give 1.5 l of a solution. Three-dimensional structures depositing alumina were dipped in this solution, and, after removal of excessive solution, dried at 150° C. for 3 hours and then calcined at 700° C. for 2 hours to obtain completed catalysts.

Amounts of alumina, neodymium oxide (Nd$_2$O$_3$) and platinum deposited on the catalysts were 20 g, 30 g and 0.8 g respectively per liter of the structures.

EXAMPLE 2

Activated alumina (2 kg) having a specific surface area of 150 m$^2$/g was weighed and wet-pulverized with water to form a slurry. The same three-dimensional structures as used in EXAMPLE 1 were dipped in the slurry, and, after removal of excessive slurry, dried at 200° C. for 3 hours and then calcined at 500° C. for 2 hours to obtain structures deposited with alumina.

Then, 307.7 g of praseodymium oxide (Pr$_6$O$_{11}$), dinitrodiaminoplatinum in an amount of 7.7 g in terms of platinum and rhodium nitrate in an amount of 4.6 g in terms of rhodium were dissolved in a diluted aqueous nitric acid solution to give 2 l of a solution. The above three-dimensional structures deposited with alumina were dipped in this solution, and, after removal of excessive solution, dried at 150° C. and then calcined at 600° C. for 2 hours to obtain completed catalyst.

Amounts of alumina, praseodymium oxide, platinum and rhodium deposited on the resulting catalysts are 10 g, 20 g, 0.5 g and 0.3 g respectively per liter of the structures.

EXAMPLE 3

Samarium nitrate [Sm(NO$_3$)$_3$.6H$_2$O] (196 g), 1402 g of neodymium nitrate, chloroplatinic acid in an amount of 1.5 g in terms of platinum, palladium chloride in an amount of 4.6 g in terms of palladium and rhodium chloride in an amount of 4.6 g in terms of rhodium were dissolved in deionized water to give 2.1 of a solution.

Three-dimensional structures which were deposited with 100 g of alumina per liter of the structures, prepared in the same manner as in EXAMPLE 1 were dipped in this solution, and, after removal of excessive solution, dried at 150° C. for 3 hours and calcined at 800° C. for one hour to obtain completed catalysts.

Amounts of alumina, samarium oxide (Sm$_2$O$_3$), neodymium oxide, platinum, palladium and rhodium deposited on the catalysts were 100 g, 5.0 g, 35 g, 0.1 g, 0.3 g and 0.3 g respectively per liter of the structures.

EXAMPLE 4

Alumina (1 kg) having a specific surface area of 150 m$^2$/g was placed in a solution in deionized water of 310 g of praseodymium nitrate, 306 g of neodymium nitrate, palladium nitrate in an amount of 23.5 g in terms of palladium and rhodium nitrate in an amount of 2.35 g in terms of rhodium, and, after sufficient stirring, dried at 150° C. for 6 hours and then calcined at 500° C. for 2 hours to obtain alumina powder containing praseodymium oxide, neodymium, palladium and rhodium. This powder (1 kg) was wet-pulverized to form a slurry. The same three-dimensional structures as used in EXAMPLE 1 were dipped in the slurry, and, after removal of excessive slurry, dried at 150° C. for 2 hours and then calcined at 400° C. for 2 hours to obtain completed catalysts.

Amounts of alumina, praseodymium oxide, neodymium oxide, palladium and rhodium deposited on the obtained catalysts were 85 g, 10 g, 10 g, 2 g and 0.2 g respectively per liter of the structures.

EXAMPLE 5

A mixed powder of 250 g of activated alumina having a specific surface area of 150 m$^2$/g and 750 g of neodymium oxide having a specific surface area of 60 m$^2$/g was placed in a solution in deionized water of rhodium nitrate in an amount of 40 g in terms of rhodium, and, after sufficient stirring, dried at 150° C. for 6 hours and then calcined at 800° C. for one hour to obtain alumina-neodymium oxide mixed powder containing rhodium.

This powder (1 kg) was wet-pulverized to form a slurry, and three-dimensional structures were dipped in the slurry in the same manner as in EXAMPLE 1, and after removal of excessive slurry, dried at 150° C. for 2 hours and calcined at 400° C. for one hour to obtain completed catalysts.

Amounts of alumina, neodymium oxide and rhodium deposited on the obtained catalysts were 20 9, 60 9 and 3.2 g respectively.

EXAMPLE 6

Zirconia powder (1 k9) having a specific surface area of 110 m$^2$/g was placed in a solution in deionized water of 790 9 of praseodymium nitrate, 255 9 of samarium nitrate, palladium nitrate in an amount of 30 g in terms of palladium and rhodium nitrate in an amount of 1 g in terms of rhodium, and, after sufficient stirring, dried at 150° C. for 6 hours and then calcined at 600° C for 2 hours to obtain zirconia powder containing praseodymium oxide, samarium oxide, palladium and rhodium.

The powder (1 kg) was wet-pulverized to form a slurry. The same three-dimensional structures as used in EXAMPLE 1 were dipped in the slurry, and, after removal of excessive slurry, dried at 150° C. for 5 hours and calcined at 700° C. for one hour to obtain completed catalysts.

Amounts of zirconia, praseodymium oxide, samarium oxide, palladium and rhodium deposited on the obtained catalysts were 100 g, 30 g, 10 g, 3 g and 0.1 g per liter of the structures.

EXAMPLE 7

Zirconia powder (2 kg) having a specific surface area of 130 m2/g was weighed and wet-pulverized with water to form a slurry. The same three-dimensional structures as used in EXAMPLE 1 were dipped in the slurry, and, after removal of excessive slurry, dried at 150° C. for 3 hours and calcined at 500° C. for 2 hours to obtain structures deposited with zirconia.

Then, 833 g of praseodymium nitrate Pr(NO$_3$)$_3$.6H$_2$O) and platinumtetramine chloride in an amount of 4.5 g in terms of platinum were dissolved in deionized water to obtain 2 l of a solution. The three-dimensional structures deposited with zirconia were dipped in this solution, and, after removal of excessive solution, dried at 150° C. for 3 hours and then calcined at 500° C. for 2 hours to obtain completed catalysts.

Amounts of zirconia, praseodymium oxide and platinum deposited on the obtained catalysts were 50 g, 20 g and 0.3 g respectively per liter of the structures.

EXAMPLE 8

Titanium (2 kg) having a specific surface area of 72 m$^2$/g was weighed and wet-pulverized with water. The same three-dimensional structures as used in EXAMPLE 1 were dipped in the slurry, and, after removal of excessive slurry, dried at 150° C. for 3 hours and calcined at 600° C. for 2 hours to obtain structures depositing titania.

Then, 784 g of praseodymium chloride (PrCl$_3$.6H$_2$O), 387 g of neodymium chloride (NdCl$_3$.6H$_2$O), 380 g of samarium chloride (SmCl$_3$.6H$_2$O) and chloroplatinic acid in an amount of 10.9 g in terms of platinum were dissolved in deionized water to obtain 2 l of a solution. The three-dimensional structures deposited with titania were dipped in this solution, and, after removal of excessive solution, dried at 150° C. for 3 hours and calcined at 600° C. for 2 hours to obtain completed catalysts.

Amounts of titania, praseodymium oxide, neodymium oxide, samarium oxide and platinum deposited on the obtained catalysts were 30 g, 20 g, 10 g, 10 g and 0.6 g respectively per liter of the structures.

EXAMPLE 9

Alumina (1 kg) having a specific surface area of 150 m$^2$/g was placed in a solution of 364 g of neodymium carbonate [Nd$_2$(CO$_3$)$_3$.3H$_2$O] in deionized water, and, after sufficient stirring, dried at 150° C. for 6 hours and calcined at 500° C. for 2 hours to obtain alumina powder containing neodymium oxide.

The same three-dimensional structures as used in EXAMPLE 1 were dipped in a slurry obtained by wet-pulverizing 1 kg of the above powder, and, after removal of excessive slurry, dried at 150° C. for 3 hours and calcined at 500° C. for one hour to obtain structures deposited with the neodymium oxide-containing alumina.

The structures deposited with the neodymium oxide-containing alumina were dipped in 2.5,l of a nitric acid-acidified aqueous solution of dinitrodiaminoplatinum in an amount of 1.24 g in terms of platinum to adsorb platinum thereon, and, after removal of excessive solution, dried at 150° C. for 3 hours and then calcined at 700° C. for 2 hours to obtain completed catalysts.

Amounts of alumina, neodymium oxide and platinum deposited on the obtained catalysts were 25 g, 5 g and 0.5 g respectively per liter of the structures.

EXAMPLE 10

The same procedures as in EXAMPLE 6 were conducted except that zirconia was replaced by composite oxide of zirconia-silica (ZrO$_2$/SiO$_2$ weight ratio=4/1) having a specific surface area of 135 m$^2$/g, whereby completed catalysts were obtained.

Amounts of zirconia-silica, praseodymium oxide, samarium oxide, palladium and rhodium deposited on the obtained catalysts were 100 g, 30 g, 10 g, 3 g and 0.1 g respectively per liter of the structures.

EXAMPLE 11

The same procedures as in Example 3 were conducted except that cordierite foam (ceramic foam, bulk density 0.35 g/cm$^3$, porosity 87.5 %, volume 2.5 l) was used in place of wall flow type honeycomb monolith as three-dimensional structure in EXAMPLE 3, whereby a completed catalyst was obtained.

Amounts of alumina, samarium oxide, neodymium oxide, platinum, palladium and rhodium deposited on the obtained catalyst were 100 g, 5.0 g, 35 g, 0.1 g, 0.3 g and 0.3 g respectively per liter of the structure.

EXAMPLE 12

Alumina (1 kg) having a specific surface area of 150 m$^2$/g was placed in a solution in deionized water of 1320 g of praseodymium nitrate, 637 g of samarium nitrate, 76 g of copper nitrate Cu(NO$_3$)$_2$.3H$_2$O], 18.5 g of sodium nitrate (NaNO$_3$), palladium nitrate in an amount of 150 g in terms of palladium and rhodium nitrate in an amount of 10 g in terms of rhodium. After sufficient stirring of the mixture, the alumina was dried at 150° C. for 6 hours, and calcined at 500° C. for one hour to obtain a mixed powder consisting of alumina, praseodymium oxide, samarium oxide, copper oxide (CuO), sodium oxide (Na$_2$O), palladium and rhodium.

The powder (1 kg) was wet-pulverized to form a slurry, and the same three-dimensional structures as used in EXAMPLE 1 were dipped in the slurry, and, after removal of excessive slurry, dried at 120° C. for 3 hours and calcined at 500° C. for one hour to obtain completed catalysts.

Amounts of alumina, praseodymium oxide, samarium oxide, copper oxide, Na$_2$O, palladium and rhodium deposited on the obtained catalysts were 20 g, 10 g, 5 g, 0.5 g, 0.1 g, 3 g and 0.2 g respectively per the structures.

EXAMPLE 13

Alumina (2 kg) having a specific surface area of 150 m$^2$/g was weighed and wet-pulverized with water to form a slurry. Cordierite monolith carriers having a size of 5.66 inches in diameter × 6.00 inches in length and having open flow gas ventilation cells in a number of about 400 per square inch of cross section were dipped in the above slurry, and, after removal of excessive slurry, dried at 150° C. for 3 hours and then calcined at 400° C for 2 hours to obtain structures depositing alumina.

Then, the structures deposited with alumina were dipped in 2.5 l of a nitric acid-acidified aqueous solution of dinitrodiaminoplatinum in an amount of 1.24 g in terms of platinum for one hour to adsorb platinum thereon, dried at 150° C. for 6 hours and then calcined at 400° C. for one hour to deposit platinum on alumina.

The platinum/alumina-depositing structures were dipped in 2 l of a solution in deionized water of 405 g of praseodymium nitrate and 200 g of neodymium nitrate, and, after removal of excessive solution, dried at 150° C. for 3 hours and then calcined at 700° C. for one hour to obtain completed catalysts.

Amounts of alumina, praseodymium oxide, neodymium oxide and platinum deposited on the obtained catalysts were 100 g, 10 g, 5 g and 0.5 g respectively per liter of the structures.

EXAMPLE 14

Zirconia (1 kg) having a specific surface area of 110 m$^2$/g was placed in a solution in deionized water of 1320 g of praseodymium nitrate, palladium sulfate in an amount of 10 g in terms of palladium and rhodium nitrate in an amount of 1 g in terms of rhodium, and, after sufficient stirring, dried at 180° C. for 3 hours and then calcined at 700° C. for one hour to obtain zirconia-praseodymium oxide-palladium-rhodium mixed powder.

The powder (1 kg) was wet-pulverized to form a slurry, and the same three-dimensional structures as used in EXAMPLE 13 were dipped in the slurry, and, after removal of excessive slurry, dried at 150° C. for 6 hours and calcined at 500° C. for one hour to obtain completed catalysts.

Amounts of zirconia, praseodymium oxide, palladium and rhodium deposited on the obtained catalysts were 100 g, 50 g, 1 g and 0.1 g respectively per liter of the structures.

EXAMPLE 15

Alumina (1 kg) having a specific surface area of 150 $m^2/g$ was placed in a solution in deionized water of 132 g of praseodymium nitrate, palladium nitrate in an amount of 20 g in terms of palladium, rhodium nitrate in an amount of 1 g in terms of rhodium and 24 g of copper sulfate, and, after sufficient stirring, dried at 150° C. for 6 hours and then calcined at 500° C. for one hour to obtain mixed powder of alumina, praseodymium oxide, palladium, rhodium and copper oxide.

The powder (1 kg) was wet-pulverized to form a slurry, and the same three-dimensional structures as used in EXAMPLE 13 were dipped in the slurry, and, after removal of excessive slurry, dried at 150° C. for 6 hours and calcined at 500° C. for one hour to obtain completed catalysts.

Amounts of alumina, praseodymium oxide, palladium, rhodium and copper oxide deposited on the obtained catalysts were 100 g, 5 g, 2 g, 0.1 g and 0.8 g respectively per liter of the structures.

EXAMPLE 16

Alumina-depositing three-dimensional structures prepared in the same manner as in EXAMPLE 13 were dipped in 2 l of a nitric acid-acidified aqueous solution containing 307 g of samarium oxide, chloroplatinic acid in an amount of 2.5 g in terms of platinum, rhodium chloride in an amount of 0.37 g in terms of rhodium and 45 g of silver nitrate ($AgNO_3$), and, after removal of excessive solution, dried at 150° C. for 3 hours and then calcined at 800° C. for one hour to obtain completed catalysts.

Amounts of alumina, samarium oxide, platinum, rhodium and silver oxide ($Ag_2O$) deposited on the obtained catalysts were 50 g, 20 g, 0.5 g, 0.05 g and 2 g respectively per liter of the structures.

EXAMPLE 17

Three-dimensional structures deposited with 200 g of alumina per liter of the structures were obtained in the same manner as in EXAMPLE 13.

The alumina-depositing three-dimensional structures were then dipped in 2 l of an aqueous solution prepared by dissolving in deionized water 406 g of praseodymium nitrate, palladium chloride in an amount of 46 g in terms of palladium, rhodium chloride in an amount of 2.3 g in terms of rhodium and 34 g of zinc nitrate [$Zn(NO_3)_2 \cdot 6H_2O$], and, after removal of excessive solution, dried at 150° C. for 3 hours and then calcined at 500° C. for one hour to obtain completed catalysts.

Amounts of alumina, praseodymium oxide, palladium, rhodium and zinc oxide (ZnO) deposited on the obtained catalysts were 200 g, 10 g, 3 g, 0.15 g and 0.6 g per liter of the structures.

COMPARATIVE EXAMPLE 1

Alumina-depositing three-dimensional structure prepared in the same manner as in EXAMPLE 2 was dipped in 2.5 l of a nitric acid-acidified aqueous solution of dinitrodiaminoplatinum in an amount of 1.5 g in terms of platinum to adsorb platinum thereon, and, after removal of excessive solution, dried at 150° C. for 3 hours and then calcined at 500° C. for 2 hours to obtain completed catalyst.

Amounts of alumina and platinum deposited on the obtained catalyst were 50 g and 0.6 g respectively.

COMPARATIVE EXAMPLE 2

Alumina (1 kg) having a specific surface area of 150 $m^2/g$ was placed in a solution prepared by dissolving in deionized water chloroplatinic acid in an amount of 10 g in terms of platinum and rhodium chloride in an amount of 6 g in terms of rhodium, and, after sufficient stirring, dried at 150° C. for 6 hours and then calcined at 500° C. for one hour to obtain platinum-rhodium-containing alumina powder.

The same three-dimensional structures as used in EXAMPLE 1 were dipped in a slurry formed by wet-pulverizing the above powder, and, after removal of excessive slurry, dried at 150° C. for 6 hours and calcined at 500° C. for one hour to obtain completed catalysts.

Amounts of alumina, platinum and rhodium deposited on the obtained catalysts were 50 g, 0.5 g and 0.3 g per liter of the structures.

COMPARATIVE EXAMPLE 3

Alumina-depositing three-dimensional structures prepared in the same manner as in EXAMPLE 2 were dipped in 2 l of an aqueous solution of palladium nitrate in an amount of 46 g in terms of palladium and rhodium nitrate in an amount of 3 g in terms of rhodium, and, after removal of excessive solution, dried at 150° C. for 3 hours and calcined at 500° C. for 2 hours to obtain completed catalysts.

Amounts of alumina, palladium and rhodium deposited on the obtained catalyst were 50 g, 3 g and 0.2 g respectively per liter of the structures.

COMPARATIVE EXAMPLE 4

Alumina (1 kg) having a specific surface area of 150 $m^2/g$ was placed in a solution prepared by dissolving in deionized water palladium nitrate in an amount of 20 g in terms of palladium, rhodium nitrate in an amount of 20 g in terms of rhodium and 607 g of copper nitrate, and, after sufficient stirring, dried at 150° C. for 6 hours and then calcined at 500° C. for one hour to obtain palladium-rhodium-copper oxide-containing alumina powder.

The same three-dimensional structures as used in EXAMPLE 1 were dipped in a slurry prepared by wet-pulverizing the above powder, and, after removal of excessive slurry, dried at 150° C. for 6 hours and calcined at 500° C. for one hour to obtain completed catalysts.

Amounts of alumina, palladium, rhodium and copper oxide deposited on the obtained catalysts were 50 g, 1 g, 1 g and 10 g respectively per liter of the structures.

COMPARATIVE EXAMPLE 5

Alumina-depositing three-dimensional structures prepared in the same manner as in EXAMPLE 13 were dipped in 2.5 l of a nitric acid-acidified aqueous solution of dinitrodiaminoplatinum in an amount of 2.5 g in terms of platinum to adsorb platinum thereon, and, after removal of excessive solution, dried at 150° C. for 3 hours and then calcined at 500° C. for 2 hours to obtain completed catalysts.

Amounts of alumina and platinum deposited on the obtained catalysts were 100 g and 1 g respectively per liter of the structures.

COMPARATIVE EXAMPLE 6

The same procedures as in EXAMPLE 15 were conducted except that praseodymium nitrate and copper nitrate were not used to obtain completed catalysts.

Amounts of alumina, palladium and rhodium deposited on the obtained catalysts were 100 g, 2 g and 0.1 g respectively per liter of the structures.

There were shown in Table 1 amounts of the respective components (refractory inorganic oxide(s), platinum group element(s), oxide(s) of rare earth element and additional component(s) deposited on the respective catalysts of the above EXAMPLES 1 to 17 and COMPARATIVE EXMAPLES 1 to 6 per liter of the respective three-dimensional structures.

TEST EXAMPLE 1

The following evaluation tests were carried out on the catalysts obtained in EXAMPLES 1 to 12 and COMPARATIVE EXAMPLES 1 to 4. There was used as engine a 4-cylinder Diesel engine having a cubic capacity of 2300 cc. As for fuel, light oil having the sulfur content of 0.03 % by weight was used in case of the platinum-containing catalysts of EXAMPLES 1, 2, 3, 7, 8, 9 and 11 and COMPARATIVE EXAMPLES 1 and 2, whereas light oil having the sulfur content of 0.3 % by weight was used in case of the catalysts of EXAMPLES 4, 5, 6, 10 and 12 and COMPARATIVE EXAMPLES 3 and 4.

[Initial test]

Capture of fine particles was carried out for about 2 hours under the condition of an engine revolution number of 2500 rpm and a torque of 4.0 kg.m. Then, torque was increased every 5 minutes at intervals of 0.5 kg.m, change in pressure loss of the catalyst layer was continuously recorded, and there were sought the temperature (Te) at which pressure increase due to accumulation of fine particles and pressure decrease due to combustion of fine particles become equal, and the temperature (Ti) at which pressure loss drastically drops due to ignition and combustion.

TABLE 1

| | Refractory inorganic oxide (g/l - carrier) | Oxide of rare earth element (g/l - carrier) | Platinum group element (g/l - carrier) | Additional component (g/l - carrier) | Three-dimensional structure (type) |
|---|---|---|---|---|---|
| Example 1 | $Al_2O_3$ 20 | $Nd_2O_3$ 30 | Pt 0.8 | — | Wall flow type |
| Example 2 | $Al_2O_3$ 10 | $Pr_6O_{11}$ 20 | Pt 0.5<br>Rh 0.3 | — | " |
| Example 3 | $Al_2O_3$ 100 | $Sm_2O_3$ 5<br>$Nd_2O_3$ 35 | Pt 0.1<br>Pd 0.3<br>Rh 0.3 | — | " |
| Example 4 | $Al_2O_3$ 85 | $Pr_6O_{11}$ 10<br>$Nd_2O_3$ 10 | Pd 2<br>Rh 0.2 | — | " |
| Example 5 | $Al_2O_3$ 20 | $Nd_2O_3$ 60 | Rh 3.2 | — | " |
| Example 6 | $ZrO_2$ 100 | $Pr_6O_{11}$ 30<br>$Sm_2O_3$ 10 | Pd 3<br>Rh 0.1 | — | " |
| Example 7 | $ZrO_2$ 50 | $Pr_6O_{11}$ 20 | Pt 0.3 | — | " |
| Example 8 | $TiO_2$ 30 | $Pr_6O_{11}$ 20<br>$Nd_2O_3$ 10<br>$Sm_2O_3$ 10 | Pt 0.6 | — | " |
| Example 9 | $Al_2O_3$ 25 | $Nd_2O_3$ 5 | Pt 0.5 | — | " |
| Example 10 | $ZrO_2$ 80<br>$SiO_2$ 20 | $Pr_6O_{11}$ 30<br>$Sm_2O_3$ 10 | Pd 3<br>Rh 0.1 | — | " |
| Example 11 | $Al_2O_3$ 100 | $Sm_2O_3$ 5<br>$Nd_2O_3$ 35 | Pt 0.1<br>Pd 0.3<br>Rh 0.3 | — | Ceramic foam |
| Example 12 | $Al_2O_3$ 20 | $Pr_6O_{11}$ 10<br>$Sm_2O_3$ 5 | Pd 3<br>Rh 0.2 | CuO 0.5<br>$Na_2O$ 0.1 | Wall flow type |
| Example 13 | $Al_2O_3$ 100 | $Pr_6O_{11}$ 10<br>$Nd_2O_3$ 5 | Pt 0.5 | — | Open flow type |
| Example 14 | $ZrO_2$ 100 | $Pr_6O_{11}$ 50 | Pd 1<br>Rh 0.1 | — | " |
| Example 15 | $Al_2O_3$ 100 | $Pr_6O_{11}$ 5 | Pd 2<br>Rh 0.1 | CuO 0.8 | " |
| Example 16 | $Al_2O_3$ 50 | $Sm_2O_3$ 20 | Pt 0.5<br>Rh 0.05 | $Ag_2O$ 2 | " |
| Example 17 | $Al_2O_3$ 200 | $Pr_6O_{11}$ 10 | Pd 3<br>Rh 0.15 | ZnO 0.6 | " |
| Comparative Example 1 | $Al_2O_3$ 50 | — | Pt 0.6 | — | Wall flow type |
| Comparative Example 2 | $Al_2O_3$ 50 | — | Pt 0.5<br>Rh 0.3 | — | " |
| Comparative Example 3 | $Al_2O_3$ 50 | — | Pd 3<br>Rh 0.2 | — | " |
| Comparative Example 4 | $Al_2O_3$ 50 | — | Pd 1<br>Rh 1 | CuO 10 | " |
| Comparative Example 5 | $Al_2O_3$ 100 | — | Pt 1 | — | Open flow type |
| Comparative Example 6 | $Al_2O_3$ 100 | — | Pd 2<br>Rh 0.1 | — | " |

Further, conversion (%) of SO$_2$ to SO$_3$ was sought at an exhaust gas temperature of 400 °C. SO$_2$ concentrations of inlet gas and outlet gas were analyzed by a non-dispersion type infrared analyzer (NDIR method), and conversion (%) of SO$_2$ was calculated according to the following calculation equation:

$$\text{SO}_2 \text{ conversion (\%)} = \frac{\text{Inlet SO}_2 \text{ concentration (ppm)} - \text{Outlet SO}_2 \text{ concentration (ppm)}}{\text{Inlet SO}_2 \text{ concentration (ppm)}} \times 100$$

[300 Hours duration test]

Catalyst duration test was conducted under full load of an engine revolution number of 2500 rpm and a catalyst inlet temperature of 600° C., activity after 300 hours was evaluated in the same manner as in initial evaluation, and thereby activity deterioration was determined.

Results of the above measurements are shown in Table 2.

used in case of the catalysts of EXAMPLES 14, 15 and 17 and COMPARATIVE EXAMPLE 6.

[Initial test]

Amounts of fine particle substances exhausted (Part) in the exhaust gases at the catalyst inlet and outlet under the condition of an engine revolution number of 2,000 rpm, a torque of 8 kg.m and a catalyst inlet temperature of 300 °C. was measured using the dilution tunnel method, and thereby purification rate (%) of the fine particle substances was determined. Further, analysis of SO$_2$ in the exhaust gases at the catalyst inlet and outlet and gaseous hydrocarbon (HC) was carried out at the same time and thereby their conversion (conv. (%)) were determined.

[300 Hours duration test]

Catalyst duration tests were carried out under full load of an engine revolution number of 2500 rpm and a catalyst inlet temperature of 600 °C., and activity after 300 hours was evaluated in the same manner as in the

TABLE 2

|  | Initial stage | | | After 300 hours duration | | |
|---|---|---|---|---|---|---|
|  | Te (°C.) | Ti (°C.) | SO$_2$ conversion (%) (at 400° C.) | Te (°C.) | Ti (°C.) | SO$_2$ conversion (%) (at 400° C.) |
| Example 1 | 328 | 341 | 71 | 336 | 357 | 76 |
| Example 2 | 351 | 362 | 58 | 368 | 381 | 56 |
| Example 3 | 362 | 389 | 21 | 363 | 387 | 24 |
| Example 4 | 376 | 392 | 2.8 | 381 | 397 | 2.6 |
| Example 5 | 379 | 397 | 0.0 | 392 | 422 | 0.0 |
| Example 6 | 358 | 368 | 2.1 | 356 | 370 | 2.4 |
| Example 7 | 341 | 356 | 63 | 342 | 351 | 67 |
| Example 8 | 319 | 332 | 68 | 343 | 359 | 63 |
| Example 9 | 336 | 343 | 78 | 339 | 351 | 74 |
| Example 10 | 348 | 363 | 3.3 | 345 | 356 | 2.9 |
| Example 11 | 356 | 378 | 18 | 360 | 378 | 20 |
| Example 12 | 371 | 393 | 0.3 | 373 | 391 | 0.2 |
| Comparative Example 1 | 390 | 408 | 76 | 442 | 463 | 73 |
| Comparative Example 2 | 416 | 423 | 63 | 478 | 493 | 65 |
| Comparative Example 3 | 431 | 465 | 3.7 | 507 | 523 | 2.9 |
| Comparative Example 4 | 476 | 498 | 0.0 | 521 | 543 | 0.0 |

TEST EXAMPLE 2

The following evaluation tests were conducted on the catalysts obtained in EXAMPLES 13 to 17 and COMPARATIVE EXAMPLES 5 and 6. As engine was used a commercial available super-charging direct injection type Diesel engine equipped with intercooler (4-cylinder engine, 2800 cc). As for fuel, light oil having the sulfur content of 0.03 % by weight was used in case of the platinum-containing catalysts of EXAMPLES 13 and 16 and COMPARATIVE EXAMPLE 5, and light oil having the sulfur content of 0.3 % by weight was initial evaluation, and thereby activity deterioration was determined.

Results of the above determinations are shown in Table 3.

TABLE 3

|  | Initial stage | | | | | After 300 hours duration | | | | |
|---|---|---|---|---|---|---|---|---|---|---|
|  | Part amount in the exhaust gas | | Part purification rate (%) | HC conv (%) | SO$_2$ conv (%) | Part amount in the exhaust gas | | Part purification rate (%) | HC conv (%) | SO$_2$ conv (%) |
|  | Inlet (mg/m$^3$) | Outlet (mg/m$^3$) |  |  |  | Inlet (mg/m$^3$) | Outlet (mg/m$^3$) |  |  |  |
| Example 13 | 26.3 | 13.8 | 47.3 | 94 | 11.5 | 25.2 | 13.2 | 47.7 | 91 | 12.4 |
| Example 14 | 29.8 | 15.4 | 48.3 | 78 | 0.0 | 31.2 | 16.1 | 48.4 | 76 | 0.0 |
| Example 15 | 27.6 | 15.1 | 45.2 | 72 | 0.0 | 28.5 | 15.8 | 44.6 | 74 | 0.0 |
| Example 16 | 25.6 | 12.4 | 51.5 | 88 | 6.7 | 26.9 | 13.6 | 49.5 | 79 | 7.1 |
| Example 17 | 28.3 | 15.6 | 44.8 | 74 | 0.2 | 25.8 | 13.9 | 46.1 | 69 | 0.4 |
| Comparative Example 5 | 27.2 | 17.7 | 35.0 | 82 | 12.6 | 25.5 | 21.5 | 15.3 | 66 | 13.4 |
| Comparative Example 6 | 30.6 | 23.3 | 24.0 | 54 | 0.0 | 29.7 | 27.4 | 7.6 | 28 | 0.0 |

It is apparent from Table 2 and Table 3 that the catalysts of the present invention wherein oxide of at least one element selected from the group consisting of praseodymium, neodymium and samarium; and at least one noble metal selected from the group consisting of platinum, palladium and rhodium (provided that palladium is not selected alone) coexist are a Diesel engine exhaust gas purification catalyst which not only have a high purification performance, but also are hard to deteriorate even under a severe condition such as a high temperature oxidation atmosphere and are excellent in durability.

We claim:

1. A catalyst for purification of exhaust gases from Diesel engines wherein catalyst components consisting essentially of (a) a refractory inorganic oxide, (b) an oxide of at least one element selected from the group consisting of praseodymium, neodymium and samarium, and (c) at least one noble metal selected from the group consisting of platinum, palladium and rhodium provided that palladium is not selected alone are deposited on a refractory three-dimensional structure.

2. The catalyst of claim 1 wherein said noble metals to be deposited are palladium and rhodium.

3. The catalyst of claim 1 or 2 wherein an oxide of at least one element selected from copper, silver, zinc, potassium and sodium is further deposited.

4. The catalyst of claim 1 wherein the said refractory inorganic oxide is at least one selected from the group consisting of activated alumina, silica, titania, zirconia, silica-alumina, alumina-zirconia, alumina-titania, silica-titania, silica-zirconia, titaniazirconia and zeolite.

5. The catalyst of claim 4 wherein the said refractory inorganic oxide is zirconia.

6. The catalyst of claim 1 wherein the said refractory three-dimensional structure is a ceramic foam, an open flow ceramic honeycomb, a wall flow type honey-comb monolith, an open flow metal honeycomb, a metal foam or a metal mesh.

7. The catalyst of claim 6 wherein the said refractory three-dimensional structure is an open flow ceramic honeycomb or an open flow metal honeycomb.

8. The catalyst of claim 1 wherein the said oxide of praseodymium, neodymium and/or samarium is deposited in an amount of 2 to 200 g in total per liter of said refractory three-dimensional structure.

9. The catalyst of claim 1 wherein the said refractory inorganic oxide is deposited in an amount of 3 to 300 g in total per liter of the said refractory three-dimensional structure.

10. The catalyst of claim 1 wherein platinum, palladium and rhodium are deposited in an amount of 0.1 to 10 g in total per liter of the said refractory three-dimensional structure.

11. The catalyst of claim 2 wherein palladium and rhodium are deposited in an amount of 0.1 to 10 g and 0.01 to 1.0 g respectively per liter of the said refractory three-dimensional structure, and the depositing ratio of palladium/rhodium is 1 to 50.

12. The catalyst of claim 3 wherein the said oxide of at least one element selected from copper, silver, zinc, potassium and sodium is deposited in an amount of 0.1 to 3 g in total per liter of the said refractory three-dimensional structure.

13. The catalyst of claim 1, wherein component (b) comprises praseodymium oxide.

14. The catalyst of claim 13, wherein component (b) is deposited in an amount of 10 to 200 g per liter of the three-dimensional structure.

* * * * *